(12) United States Patent
Sickels et al.

(10) Patent No.: US 8,824,175 B2
(45) Date of Patent: Sep. 2, 2014

(54) CONSTANT VOLTAGE WELDER CAPACITOR RIPPLE CURRENT REDUCTION METHOD AND SYSTEM

(75) Inventors: Darrell L. Sickels, Troy, OH (US); Bernard J. Vogel, Troy, OH (US)

(73) Assignee: Illinois Tool Works Inc., Glenview, IL (US)

( * ) Notice: Subject to any disclaimer, the term of this patent is extended or adjusted under 35 U.S.C. 154(b) by 1577 days.

(21) Appl. No.: 12/030,831

(22) Filed: Feb. 13, 2008

(65) Prior Publication Data

US 2009/0201704 A1    Aug. 13, 2009

(51) Int. Cl.
*H02M 1/14* (2006.01)
(52) U.S. Cl.
USPC .......................................................... 363/45
(58) Field of Classification Search
USPC ................................ 363/45; 219/130.1, 130.51
See application file for complete search history.

(56) References Cited

U.S. PATENT DOCUMENTS

| | | | |
|---|---|---|---|
| 2,473,928 A | 6/1949 | White | |
| 3,308,265 A | 3/1967 | Hobart | |
| 3,316,381 A | 4/1967 | Gibson | |
| 3,524,041 A | 8/1970 | Manz | |
| 3,657,724 A * | 4/1972 | Feeley et al. | 219/130.51 |
| 3,676,635 A * | 7/1972 | Page et al. | 219/92 |
| 3,912,980 A * | 10/1975 | Crump et al. | 361/79 |
| 6,204,476 B1 * | 3/2001 | Reynolds et al. | 219/130.51 |
| 6,344,628 B1 | 2/2002 | Nowak et al. | |
| 7,049,545 B2 * | 5/2006 | Matus et al. | 219/130.21 |
| 7,078,652 B2 * | 7/2006 | Bunker | 219/130.1 |
| 7,183,517 B2 | 2/2007 | Albrecht et al. | |
| 2002/0070205 A1 * | 6/2002 | Stava | 219/130.51 |
| 2005/0123686 A1 * | 6/2005 | Myrick | 427/446 |
| 2005/0160788 A1 * | 7/2005 | Krajci | 73/23.2 |
| 2007/0051712 A1 * | 3/2007 | Kooken et al. | 219/130.1 |
| 2007/0181547 A1 * | 8/2007 | Vogel et al. | 219/130.1 |
| 2009/0201704 A1 * | 8/2009 | Sickels et al. | 363/45 |

FOREIGN PATENT DOCUMENTS

WO            97/01211 A        1/1997

* cited by examiner

*Primary Examiner* — Adolf Berhane
*Assistant Examiner* — Yemane Mehari
(74) *Attorney, Agent, or Firm* — Fletcher Yoder P.C.

(57) ABSTRACT

A power circuit, in certain embodiments, includes an inductor to limit current through a capacitor, wherein the capacitor is configured to smooth ripple for a constant voltage welding system. More specifically, the power circuit may include a rectifier configured to convert AC power to DC power. The rectifier may be coupled to a DC bus configured to transmit the DC power. A capacitive circuit having the capacitor may be coupled across the DC bus to smooth ripple in the DC power. The inductor, e.g., coupled between the DC bus and the capacitive circuit, limits the rate of current flow between the capacitive circuit and the DC bus during a welding operation, thereby reducing heating in the output capacitive circuit. A further inductor may be coupled to one side of the DC bus to stabilize the rate of current flow from the power circuit to a load.

20 Claims, 4 Drawing Sheets

CONSTANT VOLTAGE WELDER CAPACITOR RIPPLE CURRENT REDUCTION METHOD AND SYSTEM

BACKGROUND

The present invention relates generally to the field of welding systems and, more particularly, to a system and method for reducing capacitor ripple current in constant voltage welders for reducing capacitor heat and improving welding operations.

Welding systems, such as metal inert gas (MIG) and flux cored arc welding (FCAW) welding systems, may supply a constant voltage, variable current to a continuously fed consumable electrode being fed through a welding gun, which then creates an arc between the consumable electrode and a work piece. The power supply of the welding system may have a capacitor or a bank of capacitors to smooth the output voltage. In higher power welding systems, a single capacitor may be insufficient to smooth the output voltage because the capacitor does not have any limitation on current other than its own equivalent series resistance (ESR). As a result, the capacitor may generate a substantial amount of heat as it charges and discharges during the welding process. To dissipate the heat generated, a bank of multiple capacitors is typically used to share the load. Unfortunately, the bank of capacitors adds to the cost, size, and complexity of the welding system.

BRIEF DESCRIPTION

Embodiments of the present invention provide an improved welding system utilizing a novel power conditioning circuit configured to reduce ripple current in the output capacitor. The power conditioning circuitry is designed to replace existing power conditioning circuitry used in existing welding systems, with little or no change to the other components of the systems, making it ideal for integration into existing system designs. The power conditioning circuit, in certain embodiments, includes an inductor to limit current through a capacitor, wherein the capacitor is configured to smooth the output voltage for a constant voltage welding system. The power conditioning circuit may be coupled to the output of a power supply, which may include a rectifier configured to convert AC power to DC power. The rectifier may be coupled to a DC bus configured to transmit the DC power. A capacitive circuit including a capacitor may be coupled across the DC bus to smooth ripple in the DC power. The first inductor, e.g., coupled between the DC bus and the capacitive circuit, limits the rate of change of current flow between the capacitive circuit and the DC bus during a welding operation, thereby reducing heating in the output capacitive circuit. A further inductor may be coupled to one side of the DC bus to limit the rate of change of current flow from the capacitive circuit to a load.

The embodiments of the power conditioning circuitry disclosed herein may be used in a variety of constant voltage welding systems to reduce heat generation, while also potentially reducing cost, weight, size, and complexity of the system. For example, in a welding system utilizing a bank of several capacitors for distributing heat, the bank size may be reduced, ideally, in some embodiments, to a single output capacitor. Moreover, by reducing the total number of output capacitors, the manufacturing and labor cost of producing the welding system is reduced. The reduction in ripple current also provides a reduction in the input amperage draw of the welding system, enabling the system to operate more economically.

DRAWINGS

These and other features, aspects, and advantages of the present invention will become better understood when the following detailed description is read with reference to the accompanying drawings in which like characters represent like parts throughout the drawings, wherein.

Figure 2:
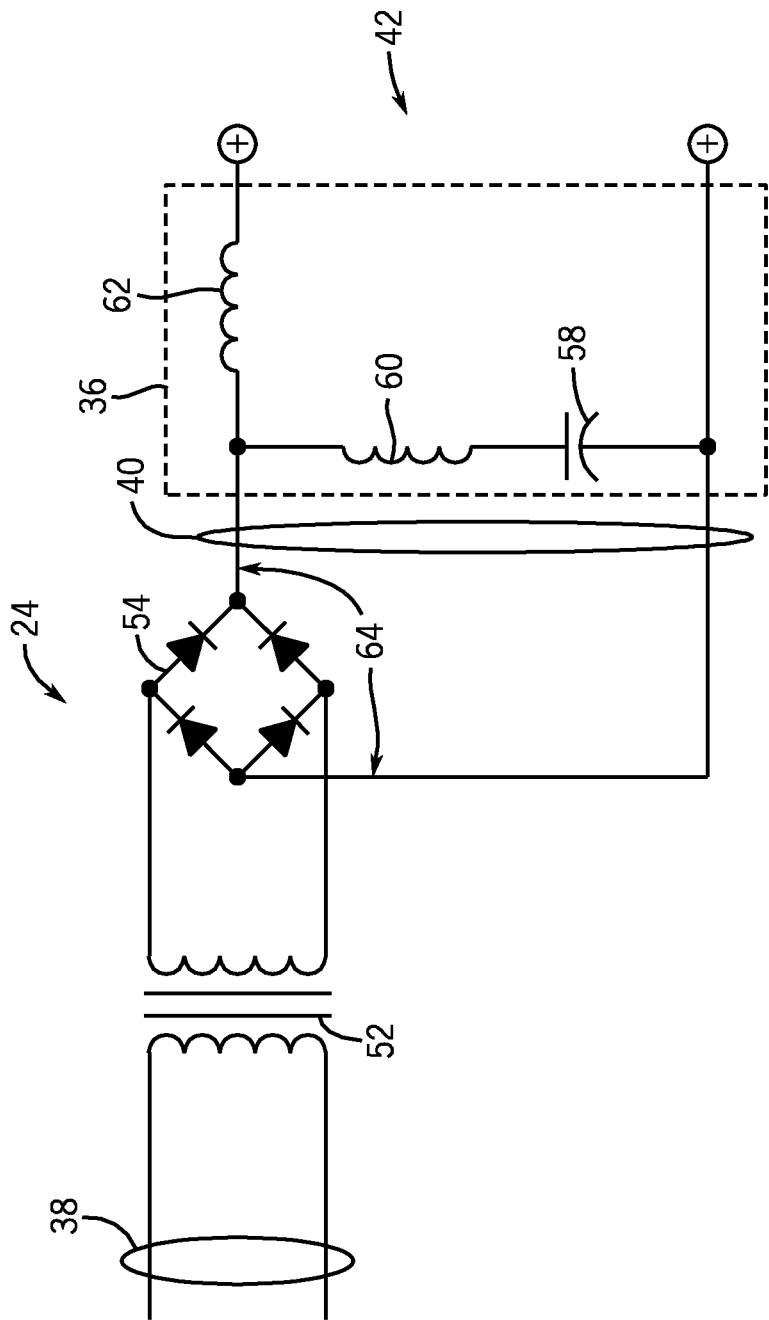
FIG. 2 is a circuit diagram illustrating exemplary components of a DC power conditioning circuit for the system of FIG. 1 in accordance with embodiments of the invention.
Figure 3:
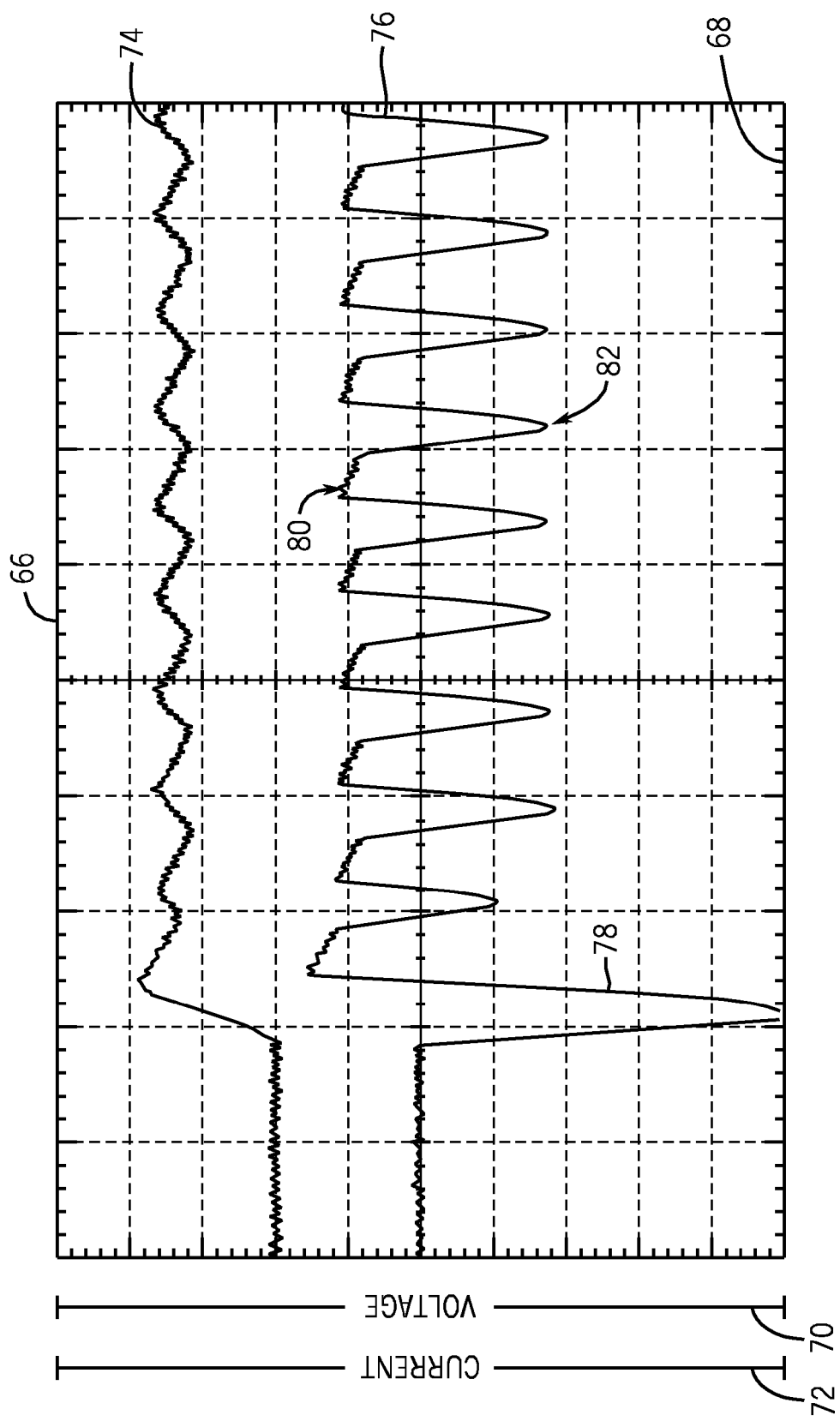
Figure 4:
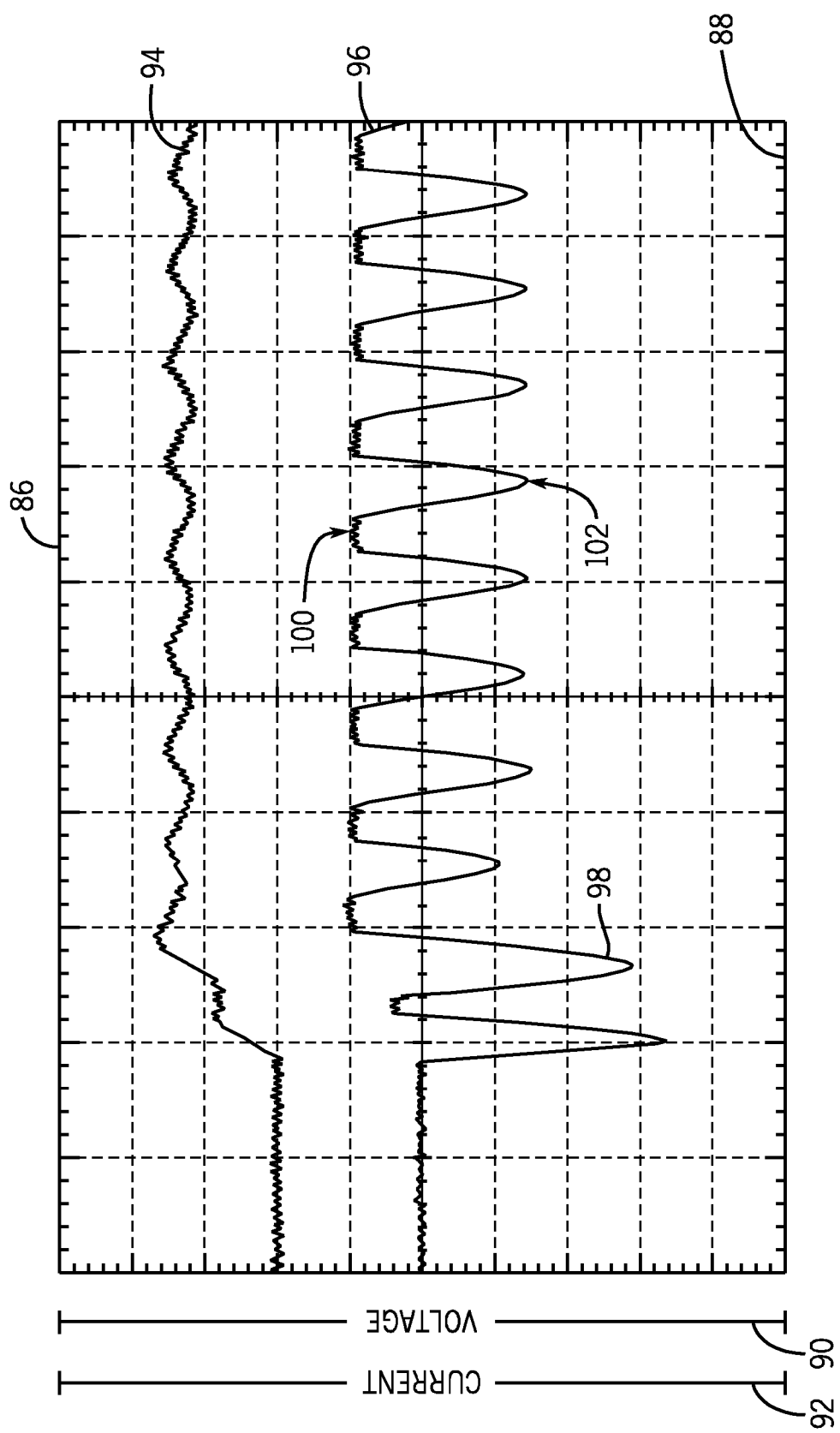

FIG. 3 is a graphical representation of voltage and current waveforms typical without embodiments (e.g., current limit on capacitor) of the power conditioning circuit of FIG. 2; and FIG. 4 is a graphical representation of voltage and current waveforms in the circuitry of FIG. 2 in accordance with embodiments of the invention, demonstrating current peak reductions, as well as enhanced voltage and current smoothing, resulting in reduced heating and improved operation of the welding operation.

DETAILED DESCRIPTION

Welding systems generally apply electrical current to an electrode so as to pass an arc between the electrode and a work piece, thereby heating the electrode and work piece to create a weld. Gas metal arc welding (GMAW), also referred to by its subtypes metal inert gas (MIG) welding or metal active gas (MAG) welding, is an arc welding process in which a continuous and consumable wire electrode and a shielding gas are fed through a welding gun. Although the term welding gun is used herein, it should be understood that welding systems may also include welding torches or the like.

Most MIG welding applications operate using a constant voltage, variable current scheme to maintain a constant arc length independent of the distance between the electrode and the work piece. That is, a constant voltage regime may be implemented in which the output voltage is constant or nearly constant during welding operations. As a result, any change in arc length, which is directly related to voltage, results in a large change in heat input and current. A shorter arc length will cause a much greater heat input, which will make the wire electrode melt more quickly and thereby restore the original arc length. In addition a common mode of operating a GMAW system may include the consumable wire electrode periodically short circuiting to the work piece, followed by an open arc upon clearing of the short circuit.

To maintain a stable arc, welding systems may include a power supply, which may include a transformer and rectifier. The transformer and rectifier may be of a single phase design or multi-phase, such as three phase. The welding system may further include power conditioning circuitry operatively coupled downstream of the power supply. The power conditioning circuitry may include an output capacitor operatively coupled to the rectifier to smooth the rectified voltage. The requirement and need for a capacitor to smooth the rectified voltage may be greater for a single phase system because of the greater ripple voltage as compared to a three phase system. The power conditioning circuitry may also include an output inductor operatively coupled to the rectifier to control the rate of change of current output to the load, particularly during a short circuit event and to generally stabilize the welding arc.

When a load is applied to the output of the constant voltage welder, the output capacitor is continuously discharging current into the load and being recharged by the power transformer and rectifier, producing a ripple current. The output inductor may be coupled in series between the output capacitor and the load to limit the current flow from the output capacitor as it discharges into the load, while the output inductor controls the dynamic change of current in order to obtain a more stable welding arc. However, since the output capacitor is coupled directly across the rectifier, the charging current flowing into the capacitor from the transformer via the rectifier is only limited by the impedance of the AC source providing power to the transformer along with the impedance of the transformer, the internal resistance of the capacitor, the impedance of the rectifier and other components inherent in the circuit. In general, it is desirable to minimize these inherent impedances and resistances in the circuit to minimize losses that cause heating and reduce overall efficiency and capacity of the welding system. Thus, the peak charging current may be of substantial magnitude and may result in a substantial RMS ripple current flowing in the capacitor. The internal losses within the capacitor and thus the internal heating may be directly related to the RMS current flowing in the capacitor. As the current increases, the heating may become substantial.

In addition, the peak charging current supplied by the transformer via the rectifier may be reflected to the primary side of the transformer by the turns ratio of the transformer and may adversely affect the transformer by increasing the RMS current in the primary and secondary windings thus resulting in unwanted heating of the transformer. In addition the higher RMS current on the primary winding of the transformer may manifest as an increase in the RMS input current supplied by the AC source, which can limit the capacity of the welding system, cause input circuit breakers to trip, etc. This may be especially important for welding systems that are supplied by single phase AC sources of limited capacity, such as typical 115 VAC single phase AC sources.

Figure 1:
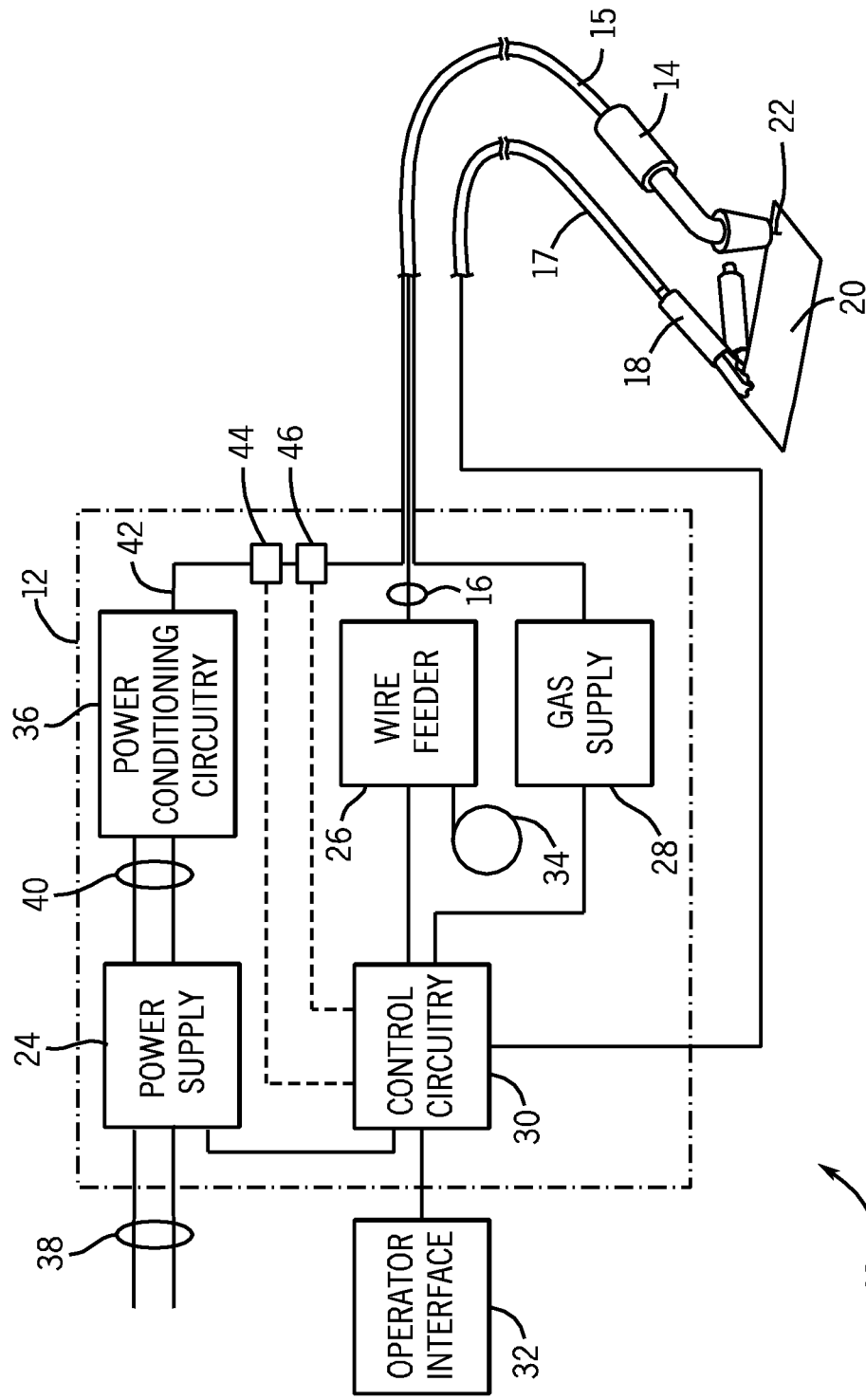
FIG. 1 is a diagrammatical overview of an exemplary welding system adapted for reduced heating and improved operation in accordance with embodiments of the invention.

Turning now to the drawings and referring first to FIG. 1, a welding system 10 is illustrated having improved power conditioning circuitry adapted for reduced heating in accordance with certain embodiments of the present invention. The improved power conditioning circuitry may include an additional inductor which may be coupled in series with the load to limit the rate of change of the output current, thus improving the control of the dynamic current output to reduce heating in the welding system and to produce a more stable welding arc, as will be discussed in further detail below.

The illustrated welding system 10 includes a base unit 12 operably coupled with a welding gun 14 via a conduit 15. The system 10 also includes an electrode 16 (e.g., welding wire) fed through the conduit 15 and to the gun 14, a ground cable 17 having a ground clamp 18 coupled to a work piece 20, and a power supply 24. Placement of the welding gun 14 proximate to a work piece 20 allows electrical current, supplied by the power supply 24, to form an arc 22 from the electrode 16 to work piece 20. The arc 22 completes an electrical circuit from the power supply 24 to the electrode 16, to the work piece 20, then back to ground via the ground clamp 18 and the ground cable 17, which is operably coupled to the power supply 24 through the control circuitry 30. The heat produced by the arc 22 causes the electrode 16 and/or the work piece 20 to transition to a molten state, thereby creating the weld.

The welding system 10 also includes a wire feeder 26, a gas supply 28, and an electrode supply 34. A base unit 12 supplies the welding gun 14 with voltage and current from the power supply 24, electrode 16 from the electrode supply 34 through the wire feeder 26, and shielding gas from the gas supply 28 through a conduit 15. The electrode 16 may be any suitable type of traditional consumable electrode. Also, in alternate embodiments, the electrode 16 may include a non-consumable electrode without the wire feeder 26 or electrode supply 34. Shielding gas from the gas supply 28 shields the weld area from contaminants during the welding process in order to enhance arc performance and to improve the quality of the resulting weld. An operator may manipulate welding parameters via an operator interface 32 coupled to the control circuitry 30 in order to precisely control the deposition of molten material from the electrode 16 onto the work piece 20. Where operator inputs are used, these may be provided by digital devices, analog circuits (i.e., dials with associated potentiometers), and so forth.

In the illustrated embodiment, operator inputs received by the operator interface 32 are relayed to the control circuitry 30. The control circuitry 30 is operably coupled to and configured to control each of the power supply 24, the wire feeder 26, and the gas supply 28 based on the operator inputs received via the operator interface 32. For example, the control circuitry 30 may be configured to adjust the welding power output 40 from power supply 24 based on operator inputs, as well as by monitoring supply voltage and current with voltage sensor 44 and current sensor 46. The control circuitry 30 may be further configured to regulate the advancement of the electrode 16 via the wire feeder 26, as well as the shielding gas output from the gas supply 28 based on the operator inputs. Although not represented in FIG. 1, the operator interface 32 and control circuitry 30 are, of course, supported by ancillary devices and circuitry, such as power supplies, memory devices, signal conditioning circuitry, and so forth.

The welding system 10 may also include power conditioning circuitry 36 operatively coupled downstream of the power supply 24. The power supply 24 may be configured to receive and convert an AC power input 38 received by the base unit 12 into a DC power signal 40. In certain embodiments, the power supply 24 may include a transformer-rectifier type design. In the illustrated embodiment, the power conditioning circuitry 36 may be configured to smooth ripple in the DC power output 40 provided by the rectified and transformed AC input 38. The smoothed DC power signal 42 is then provided by the power conditioning circuitry 36 for delivering welding power to the welding torch 14.

FIG. 2 is a circuit schematic diagram illustrating the components of the exemplary power supply 24 in accordance with an embodiment of the present invention. As discussed above, the power supply 24 may include a transformer-rectifier type design, provided in FIG. 2 by the transformer 52 and the rectifier 54. The power supply circuitry 24 receives AC power input signal 38. In one embodiment, the AC power input 38 may be provided by 230 volt single phase AC power. The transformer 52 may be configured to convert the line voltage to a reduced voltage suitable for welding applications, typically in the range of 17 to 38 volts. The reduced voltage is applied to the rectifier 54, which may be configured to rectify the transformed AC power to DC power. While the circuit of FIG. 2 is described as receiving single phase AC power, alternate embodiments may utilize three phase AC power.

In the illustrated embodiment, the DC bus 64 includes a high and low side, and is further coupled to power conditioning circuitry 36 for smoothing ripple in the DC power 40. The illustrated power conditioning circuitry 36 includes an output capacitor 58, an output inductor 62, and a second inductor 60 coupled in series between the output capacitor and the DC bus 64. While the illustrated embodiment includes a single output capacitor 58, additional capacitors, for example, a bank of capacitors electrically coupled in parallel, may be utilized for improved heat reduction. However, as noted above, additional capacitive components may increase welding system manufacturing costs and result in a bulkier and less portable system design.

The output capacitor 58 is configured to smooth voltage ripple in the DC power output 40. For example, in a constant voltage welder operating at 60 Hz, the arc voltage, without the output capacitor 58, may go to 0 volts every 8.33 milliseconds as a result of the full wave rectification via the rectifier 54 of the AC power signal produced by the power transformer 52. When a load, such as a welding arc, is applied to the output of the welding system 10, the output capacitor 58 is continuously discharging current into the load and being recharged by the power transformer 52, generating heat as current flows into and out of the output capacitor 58. The output inductor 62 is coupled in series with the load to stabilize the rate of current flow from the transformer and output capacitor 58 into the load, controlling dynamic change of current in order to obtain a more stable welding arc.

In contrast to the embodiment of FIG. 2, the output capacitor 58 could be coupled directly across the rectifier 54. Unfortunately, without the inductor 60, output capacitor 58 current is only limited by the inherent series resistances and impedances in the transformer, rectifier, capacitor and other circuit elements when it is being charged by the power transformer 52. During the initial charging phase, there is usually a large spike in current level without the inductor 60, thereby contributing to additional heating of the capacitor 58. Furthermore, when measured, the output capacitor 58 ripple current is typically higher than the welding current.

In the welding system 10 utilizing the improved power conditioning circuitry 36 of FIG. 2, the second inductor 60 is coupled in series between the output capacitor 58 and the DC bus 64 and is configured to limit the rate of current flow between the output capacitor 58 and the DC bus 64 during welding operations. By reducing the rate of current flow into the output capacitor 58 from the power transformer 52 during each charging phase, the overall ripple current level in the output capacitor 58 is reduced, thereby reducing the overall heat generated when the output capacitor 58 is charging and discharging. In view of the reduced heat generation, a smaller number of capacitors (e.g., one capacitor 58) may be used in the power conditioning circuitry 36 to reduce size, weight, cost, and complexity of the system 10.

In one or more embodiments, the output capacitor 58 may have a capacitive value of approximately 100,000 µF, the output inductor 62 may have a value of approximately 200 µH, and the inductor 60 may have a range of approximately 10% of the value of the output inductor 62, in this case, approximately 20 µH. This configuration may, in particular embodiments, result in approximately a 10% reduction in the output capacitor 58 ripple current, as a well as a 25% reduction in total power dissipated in the output capacitor 58. Peak to peak current levels between the charging and discharging cycles may also be reduced by 20% or more. In other embodiments, the output capacitor 58 may have a capacitive value in a range of 50,000 to 100,000 µF, and the output inductor may have an inductance in the range of 10-30 µH. FIGS. 3 and 4 will more clearly illustrate these improvements using graphical representations.

FIGS. 3 and 4 are graphical representations of voltage and current wave forms for a constant voltage MIG welding system without and with current control for the output capacitor 58, respectively. Specifically, FIG. 3 illustrates voltage and current waveforms without the inductor 60 shown in FIG. 2, whereas FIG. 4 illustrates voltage and current waveforms with the inductor 60 shown in FIG. 2. In FIG. 3, the current and voltage graph 66 includes an X axis representing time 68 and a Y axis representing both voltage 70 and current 72. The output capacitor voltage is represented by trace line 74, and the output capacitor current is represented by trace line 76. As illustrated in FIG. 3, following the initial charging phase, the capacitor voltage 74 remains relatively constant during the MIG welding operation.

As discussed above, if an output capacitor (e.g., capacitor 58) in a MIG welder is coupled directly across the rectifier, then it has no current limitation other than the equivalent series resistance inherent within the circuit when it is being charged by a power transformer. As such, there is usually a large spike in current level during the initial charging phase, represented in FIG. 3 by reference numeral 78.

Following the initial charging phase, the output capacitor continuously discharges current into the load and is recharged by the power transformer. The peak current levels during each discharge and charge phase are represented respectively by reference numerals 80 and 82. Disadvantageously, the large initial spike 78 and the subsequent charging cycles 82 both contribute to heating of the output capacitor.

Turning now to FIG. 4, a graphical representation of voltage and current waveforms of the output capacitor of the improved power conditioning circuit 36 of FIG. 2 is illustrated, demonstrating current peak reductions, as well as enhanced voltage and current smoothing, resulting in reduced heating and improved operation in a constant voltage MIG welding application. The current and voltage graph 86 includes X and Y axes scaled equivalently to the X (68) and Y axes (70 and 72) illustrated in FIG. 3, wherein the X axis represents time 88 and the Y axis represents both voltage 90 and current 92. The output capacitor voltage is represented by trace line 94, whereas the output capacitor current is represented by trace line 96. As illustrated in FIG. 4, following the initial charging phase, the capacitor voltage 94 remains relatively constant during the MIG welding operation.

As discussed above, the improved power conditioning circuitry includes an inductor 60 coupled in series between the output capacitor 58 and the DC bus 64, wherein the inductor 60 is configured to limit the rate of current flow to the capacitor 58, causing a reduction in the output capacitor 58 ripple current, as illustrated by trace line 96. As illustrated in FIG. 4, during the initial charging phase of the output capacitor 58, the initial spikes 98 in current level are much smaller compared to the large initial spike 78 of the system without the inductor 60, as illustrated in FIG. 3.

Following the initial charging phase, the output capacitor 58 continuously discharges current into the load and is recharged by the power transformer 52. The current peaks during each discharge and charge phase are represented respectively by reference numerals 100 and 102, and are reduced compared to the current peaks 80 and 82 of the conventional MIG welder of FIG. 3.

The reduction in the overall ripple current level of the improved power conditioning circuitry of the illustrated embodiments reduces heating in the output capacitor during welding operations. Furthermore, by reducing the ripple current level, the overall input amperage draw of the welding system is also reduced, thereby allowing the welding system to operate more efficiently and economically.

While only certain features of the invention have been illustrated and described herein, many modifications and changes will occur to those skilled in the art. It is, therefore, to be understood that the appended claims are intended to cover all such modifications and changes as fall within the true spirit of the invention.

The invention claimed is:

1. A welding system, comprising:
   a rectifier circuit for converting AC power to DC power;
   a DC bus having a high side and a low side, wherein the DC bus is coupled to the rectifier circuit to transmit the DC power;
   a capacitive circuit coupled across the DC bus and configured to smooth ripple in the DC power;
   a first inductor coupled to one side of the DC bus; and
   a second inductor coupled in series with the capacitive circuit between the high side and the low side of the DC bus, and wherein the second inductor is configured to limit rates of current flow between the capacitive circuit and the DC bus during operation.

2. The welding system of claim 1, wherein the rectifier circuit is configured to rectify a single phase input power.

3. The welding system of claim 2, comprising a transformer coupled electrically upstream of the rectifier circuit and configured to convert line voltage to a reduced voltage for application to the rectifier circuit.

4. The welding system of claim 1, wherein the capacitive circuit includes only a single capacitor.

5. The welding system of claim 1, wherein the second inductor has an inductance value of approximately 10% of the inductance value of the first inductor.

6. The welding system of claim 1, comprising a power control circuit coupled to the DC bus and configured to control at least one of voltage or current output to a welding gun.

7. The welding system of claim 6, wherein the power control circuit implements a constant voltage regime for a MIG welding operation.

8. The welding system of claim 1, wherein the capacitive circuit and the second inductor are configured to reduce peaks in current draw from the DC bus to charge the capacitive circuit in operation by at least 20% as compared to a circuit including only the first inductor and the capacitive circuit without the second inductor.

9. The welding system of claim 1, wherein the capacitive circuit has a capacitance in a range from about 50,000 microfarads to about 100,000 microfarads.

10. The welding system of claim 9, wherein the second inductor has an inductance in a range from about 10 microhenrys to about 30 microhenrys.

11. A method for conditioning power in a welding system comprising:
    rectifying AC power to DC power;
    applying the DC power to a DC bus having a high side and a low side;
    smoothing ripple in the DC power on the DC bus via a capacitive circuit coupled across the bus; and
    limiting current exchange between the DC bus and the capacitive circuit via an inductor coupled in series with the capacitive circuit and disposed between the high side of the DC bus and the capacitive circuit.

12. The method of claim 11, comprising limiting a rate of change of current output from the DC bus to a welding torch via an inductor electrically coupled in series on one side of the DC bus.

13. The method of claim 11, wherein the capacitive circuit includes only a single capacitor.

14. The method of claim 11, comprising regulating power from the DC bus in accordance with a constant voltage regime for a MIG welding operation.

15. The method of claim 11, comprising transforming line voltage to a reduced voltage prior to rectification.

16. The method of claim 11, wherein the capacitive circuit and the inductor reduce peaks in current draw from the DC bus to charge the capacitive circuit in operation by at least 20% as compared to a circuit without the inductor.

17. A welding system comprising:
    a power supply comprising a rectifier configured to convert an AC signal into a DC signal and to transmit the DC signal on a DC bus; and
    a power conditioning circuit comprising:
       a first inductor coupled to a first side of the DC bus;
       a capacitor coupled between the first side and a second side of the DC bus and being configured to smooth ripple in the DC signal; and
       a second inductor coupled between the first side and the second side of the DC bus in series with the capacitor and being configured to limit rates of current flow between the capacitor and the DC bus.

18. The system of claim 17, comprising a controller configured to regulate at least one of voltage and current from an output of the DC bus to a welding torch.

19. The system of claim 18, wherein the controller is configured to control at least one of voltage and current from the output of the DC bus in accordance with a constant voltage regime for a MIG welding operation.

20. The system of claim 18, wherein the controller is configured to monitor voltage and current from the output of the DC bus using a voltage sensor and a current sensor, respectively.

* * * * *